(12) United States Patent
Babourine

(10) Patent No.: US 12,373,553 B2
(45) Date of Patent: Jul. 29, 2025

(54) STATE-BASED DETECTION OF ANOMALOUS API CALLS WITHIN A REAL-TIME DATA STREAM

(71) Applicant: Salesforce, Inc., San Francisco, CA (US)

(72) Inventor: Stanislav Babourine, Walnut Creek, CA (US)

(73) Assignee: Salesforce, Inc., San Francisco, CA (US)

( * ) Notice: Subject to any disclaimer, the term of this patent is extended or adjusted under 35 U.S.C. 154(b) by 273 days.

(21) Appl. No.: 17/478,353

(22) Filed: Sep. 17, 2021

(65) Prior Publication Data
US 2023/0090132 A1    Mar. 23, 2023

(51) Int. Cl.
G06F 21/55    (2013.01)

(52) U.S. Cl.
CPC ...... G06F 21/554 (2013.01); *G06F 2221/034* (2013.01)

(58) Field of Classification Search
CPC ............... G06F 21/554; G06F 221/034; G06F 2221/034
See application file for complete search history.

(56) References Cited

U.S. PATENT DOCUMENTS

| | | | | |
|---|---|---|---|---|
| 2005/0273673 A1* | 12/2005 | Gassoway | ............. | G06F 21/552 714/45 |
| 2015/0319185 A1* | 11/2015 | Kirti | ................... | H04L 63/1416 726/23 |
| 2016/0099963 A1* | 4/2016 | Mahaffey | ............. | G06F 21/554 726/25 |
| 2017/0180403 A1* | 6/2017 | Mehta | ................. | H04L 63/1425 |
| 2018/0069885 A1* | 3/2018 | Patterson | ................ | G06F 16/27 |
| 2018/0091536 A1* | 3/2018 | Chrosziel | ............ | H04L 63/1416 |
| 2018/0091559 A1* | 3/2018 | Luger | ................... | H04L 63/145 |
| 2018/0287982 A1 | 10/2018 | Draeger et al. | | |
| 2019/0026491 A1* | 1/2019 | Telford | ............... | G06F 21/6227 |
| 2019/0294796 A1* | 9/2019 | Elango | .................. | G06F 21/554 |
| 2020/0125715 A1* | 4/2020 | Yaqub | ..................... | G06F 21/41 |
| 2020/0244797 A1* | 7/2020 | Horelik | ............... | H04L 63/0407 |
| 2020/0381017 A1* | 12/2020 | Garak | .................... | G11B 27/34 |
| 2020/0409826 A1* | 12/2020 | Balasubramanian | ........ | G06F 11/3668 |
| 2021/0081441 A1* | 3/2021 | Kaushik | .............. | G06F 9/45558 |
| 2021/0136095 A1* | 5/2021 | Dinh | ........................ | G06N 5/01 |
| 2021/0227014 A1* | 7/2021 | Boukhtouta | .......... | H04W 4/029 |

(Continued)

OTHER PUBLICATIONS

Al Lelah et al. "Abuse of cloud-based and public legitimate services as command-and-control (c&c) infrastructure: a systematic literature review." Journal of Cybersecurity and Privacy 3.3. Sep. 1, 2023, p. 558-590. (Year: 2023).*

(Continued)

*Primary Examiner* — Carl G Colin
*Assistant Examiner* — Zhe Liu
(74) *Attorney, Agent, or Firm* — Lee & Hayes, P.C.

(57) ABSTRACT

Media, methods, and systems are disclosed for detecting anomalous API calls within a real-time data flow. A real-time data stream is received. The real-time data stream is filtered. A stored state is modified based on a log entry data element within the filtered real-time data stream. An API call associated with the modified stored state is detected to be anomalous. Finally, a remediation action is taken for the API call.

20 Claims, 5 Drawing Sheets

(56) References Cited

U.S. PATENT DOCUMENTS

| | | | |
|---|---|---|---|
| 2021/0289020 A1* | 9/2021 | Rolfe | G06N 3/047 |
| 2022/0086180 A1* | 3/2022 | Karpovsky | H04L 63/1425 |
| 2022/0116420 A1* | 4/2022 | Weber | G06F 21/554 |
| 2022/0171800 A1* | 6/2022 | Kumaresan | G06F 11/321 |
| 2022/0342745 A1* | 10/2022 | Gonzalez Macias | G06F 40/30 |

OTHER PUBLICATIONS

"Die, Email, Die! A Flickr Cofounder Aims to Cut Us All Some Slack", Readwriteweb, LexisNexis, https://advance.lexis.com/api/permalink/33dd79e2-90f5-409d-ae27-5a2c7e86bf31/?context=1000516>. (dated Aug. 14, 2013, 4:15 PM) 2 pages.

"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 13 pages.

Adrienne LaFrance, "The Triumph of Email", Atlantic Online, LexisNexis, https://advance.lexis.com/api/permalink/32d7ddd9-d4c1-4a73-86f7-08ab5842fde6/?context=1000516, (dated Jan. 6, 2016) 5 pages.

David Auberbach, "Re-Animator. How Stewart Butterfield created Flickr and Slack out of the ashes of failed projects" [online][retrieved May 9, 2019]. Retrieved from the Internet: <URL: https://slate.com/business/2014/05/stewart-butterfield-flickr-and-slack-how-he-snatched-victory-from-the-jaws-of-defeat.html> (dated May 28, 2014, 2:48 PM) 8 pages.

Ernie Smith, "Picking up the Slack", Tedium, [online][retrieved May 9, 2019]. Retrieved from the Internet: <URL: https://tedium.co/2017/10/17/irc-vs-slack-chat-history/>. (dated Oct. 17, 2017) 13 pages.

Internet Relay Chat, Wikipedia, [online][retrieved May 30, 2019]. Retrieved from the Internet: <URL: https://en.wikipedia.org/wiki/Internet_Relay_Chat>. (dated May 28, 2019) 20 pages.

Jonathan Vanian, "Why these startups think chat apps are the next big thing in workplace collaboration", GIGAOM, LexisNexis, https://advance.lexis.com/api/permalink/e83778c8-09c8-43aa-9ba0-88526283de69/?context=1000516, (dated Aug. 1, 2014, 5:45 PM) 4 pages.

Matsumoto, T. et al., "Chocoa Communicator—A New Communication System Based on Awareness and Text Communications-", Fujitsu Sci. Tech. J., 36, 2, (Dec. 2000) 154-161.

Matthew Ingram, "Flickr co-founder launches Slack, an all-in-one messaging tool designed to kill email forever", GIGAOM, LexisNexis, https://advance.lexis.com/api/permalink/0b676b7c-aec3-4560-861e-d030d1dd008c/?context=1000516, (dated Feb. 12, 2014, 7:03 PM), 2 pages.

Michael Carney, "Slack is thriving on a cocktail of whimsy and great timing", PandoDaily, LexisNexis, https://advance.lexis.com/api/permalink/dd2d4ee5-2ddf-4d3a-a1d9-3bcee5e38b74/?context=1000516, (dated Feb. 6, 2015, 2:12 AM) 3 pages.

Mike Issac, "Slack, a Start-Up With an App to Foster Business Collaboration, Is Valued at $1.1 Billion", The New York Times Blogs (Bits), LexisNexis, https://advance.lexis.com/api/permalink/3eb84b34-a8f9-4d7d-9573-89d9598a4963/?context=1000516>. (dated Oct. 31, 2014) 2 pages.

Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 57 pages.

Rebecca Walberg, "Email biggest office waste of time: survey", National Post, at FP10, Lexisnexis, https://advance.lexis.com/api/permalink/96268e3f-26ad-48ac-a98f-6c39804ebded/?context=1000516, (dated Mar. 4, 2014) 2 pages.

Robert Hof, "Stewart Butterfield on How Slack Became a $2.8 Billion Unicorn", Forbes, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 3 pages.

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 27 pages.

\* cited by examiner

STATE-BASED DETECTION OF ANOMALOUS API CALLS WITHIN A REAL-TIME DATA STREAM

TECHNICAL FIELD

Embodiments of the invention relate to detecting anomalous data within a real-time data stream. More specifically, embodiments of the invention relate to using a stored state to detect anomalous API calls within a real-time data stream relating to such API calls.

Storing real-time data streams typically requires collecting the data in a database to be reviewed later, further requiring an index to be constructed based on the complete data set. This database can then later be queried using structured searches to look for specific conditions. However, such a system has a number of drawbacks. It requires a large amount of memory to store the complete data set, it requires that the rules be expressed as search queries which can make it difficult to find unknown anomalies, it is difficult to scale, and it requires third-party tools to operate. Furthermore, such systems require discrete queries to be made for each condition, and the update rate is therefore limited by the number of queries that must be run for each update. Particularly for complex, high-volume systems, this makes updating in real time (or even near real time) infeasible. As such, there is a need for real-time monitoring for anomalous data within a real-time data stream.

SUMMARY

Embodiments of the invention address the above-identified problems by providing a mechanism for filtering significant information from the real-time data stream and detecting anomalous data from within the filtered real-time data stream. Anomalous data can be detected by storing the state of information found within the filtered real-time data stream. Changes to the state or certain state values may correspond with anomalous data. Once anomalous data is detected, one or more remediation actions can occur. This invention is able to detect anomalies in a real-time data stream without storing the entire data set in memory and is easy to scale, resulting in a more efficient and optimized detection system.

In particular, in a first embodiment, the invention includes one or more non-transitory computer-readable media storing computer-executable instructions that, when executed by a processor, perform a method for detecting anomalous data within a real-time data stream, the method comprising: receiving the real-time data stream from a real-time data source, the real-time data stream comprising a plurality of log entries, each log entry including a plurality of data elements associated with a respective application programming interface (API) call; filtering the real-time data stream based on one or more filter criteria to obtain a filtered real-time data stream comprising a subset of the plurality of log entries; modifying a stored state corresponding to one or more log entry data elements based in part on a log entry of the subset of the plurality of log entries; detecting that the respective API call is an anomalous API call based in part on the modified stored state; responsive to detecting the anomalous API call, taking one or more remediation actions.

In a second embodiment, the invention includes a method for monitoring anomalous data within a real-time data stream, the method comprising: receiving the real-time data stream from a real-time data source, the real-time data stream comprising a plurality of log entries, each log entry including a plurality of data elements associated with a respective application programming interface (API) call; filtering the real-time data stream based on one or more filter criteria to obtain a filtered real-time data stream comprising a subset of the plurality of log entries; modifying a stored state corresponding to one or more log entry data elements based in part on a log entry of the subset of the plurality of log entries; detecting that the respective API call is an anomalous API call based in part on the modified stored state; and responsive to detecting the anomalous API call, taking one or more remediation actions.

In a third embodiment, the invention includes a system comprising at least one processor and at least one non-transitory memory storing computer executable instructions that when executed by the processor cause the system to carry out actions comprising: receiving the real-time data stream from a real-time data source, the real-time data stream comprising a plurality of log entries, each log entry including a plurality of data elements associated with a respective application programming interface (API) call; filtering the real-time data stream based on one or more filter criteria to obtain a filtered real-time data stream comprising a subset of the plurality of log entries; modifying a stored state corresponding to one or more log entry data elements based in part on a log entry of the subset of the plurality of log entries; detecting that the respective API call is an anomalous API call based in part on the modified stored state; and responsive to detecting the anomalous API call, taking one or more remediation actions.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 1:
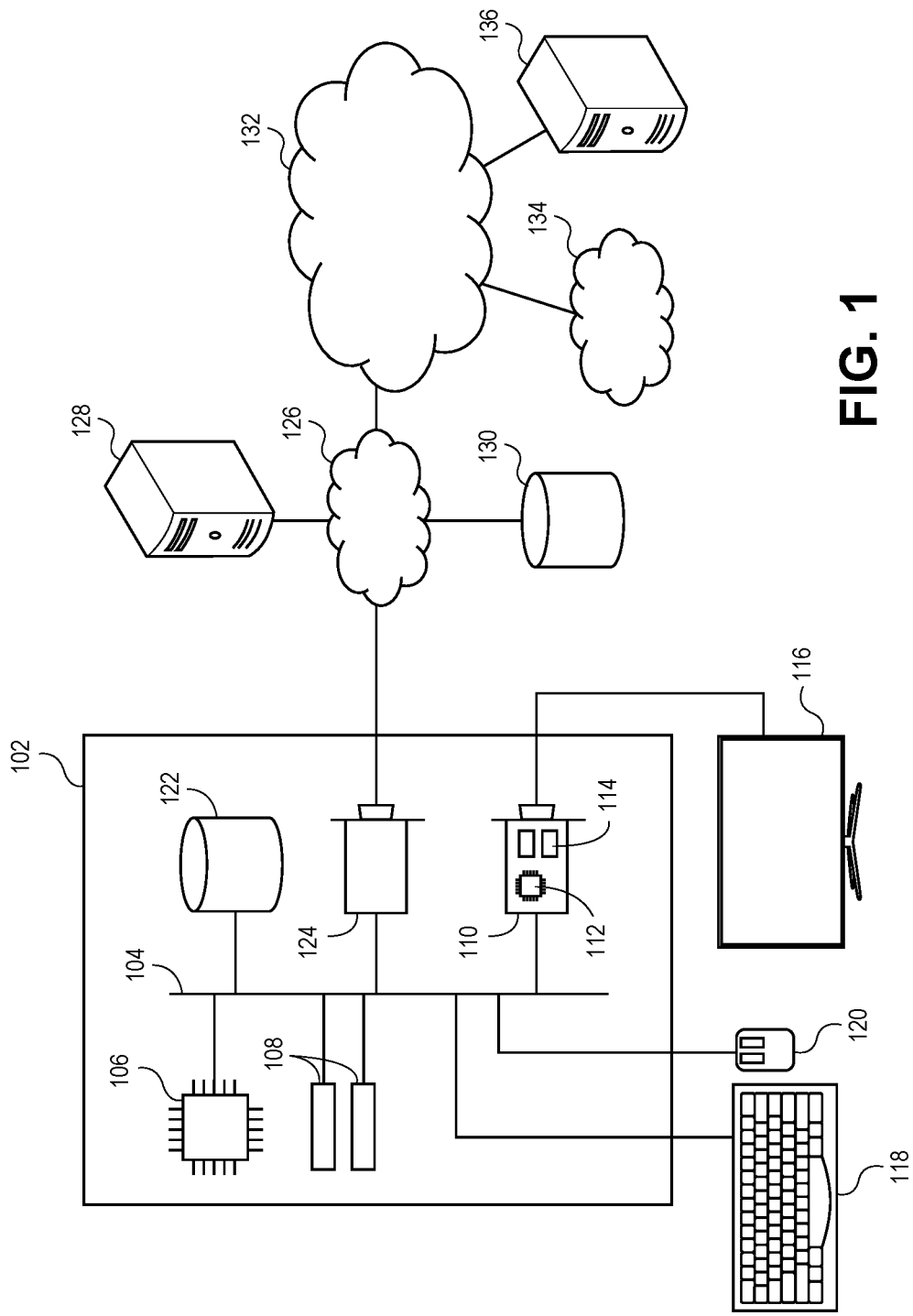
FIG. 1 depicts an exemplary hardware platform for certain embodiments of the invention.

The drawing figures do not limit the invention to the specific embodiments disclosed and described herein. The drawings are not necessarily to scale, emphasis instead being placed upon clearly illustrating the principles of the invention.

DETAILED DESCRIPTION

Context and Concepts of the Invention

As used herein, the term "group-based communication system" refers to a collaborative communication system used within an organization and is distinct from a conventional email system. In some embodiments, the group-based communication system is a channel-based messaging platform. Within the group-based communication system, communication may be organized into "channels," each dedicated to a particular topic or set of users. Channels are generally long-lasting, persistent discussions of a particular topic. Members of a particular channel can post messages within that channel that are visible to other members of that channel together with other messages in that channel. Users may select a channel for viewing in order to see only those messages relevant to the topic of that channel without seeing messages posted in other channels on different topics. For example, a software development company may have different channels for each software product being developed, where developers working on each particular project can converse without bothering (or being bothered by) developers working on other projects. Because the channels are generally persistent and directed to a particular topic or group, users can quickly and easily refer back to previous communications for reference.

Communication data within a group-based communication system may include messages, queries, files (e.g., documents, spreadsheets, computer code, images, video, audio, and/or electronic contact information), mentions, users or user profiles, interactions (e.g., reactions, edits, deletions, and/or prioritizations such as by pinning or starring), tickets, channels, applications integrated into one or more channels, conversations (e.g., groups of messages that have been segmented as single units), workspaces (e.g., sets of channels, users, projects, tasks within an organization that may have their own sets of permissions and that may be organized substantially in line with an organization chart in some instances) or other data generated by or shared between users of the group-based communication system that are associated with an organization's communication data using the group-based communication system.

In some instances, the communication data may comprise data associated with a user (e.g., a user profile), including, but not limited to, a user identifier, one or more communication channel identifiers associated with communication channels to which the user has been granted access, one or more group identifiers for groups (or organizations, teams, entities, or the like) with which the user is associated, an indication of whether the user is an owner or manager of any communication channels, an indication of whether the user has any communication channel restrictions, a plurality of messages, a plurality of emoji, a plurality of conversations, a plurality of conversation topics, an avatar, an email address, a real name (e.g., Austin Author), a username (e.g., austin_a), a password, user preferences and/or settings, a time zone, a status, a token, and other user-specific information. In some embodiments, the group-based communication system may additionally or alternatively store permissions data associated with permissions of individual users of the group-based communication system. In some embodiments, permissions associated with an individual user can be mapped to, or otherwise associated with, an account or profile associated with user data. Permissions can indicate which users can communicate directly with other users, which channels a user is permitted to access, restrictions on individual channels, which workspaces the user is permitted to access, and restrictions on individual workspaces, for example. In some embodiments, the permissions can support the group-based communication system by maintaining security for limiting access to a defined group of users. In some such embodiments, such users can be defined by common access credentials, group identifiers, or other criteria, as described above.

In some embodiments, the group-based communication system can be partitioned into different workspaces, which can be associated with different groups of users. Each workspace can be associated with a group identifier and one or more user identifiers can be mapped to, or otherwise associated with, the group identifier. Users corresponding to such user identifiers may be referred to as "members" of the group. A workspace may comprise one or more channels that are unique to that workspace and/or one or more channels that are shared between one or more workspaces. In some embodiments, workspaces can be associated with one or more organization identifiers, which can be associated with organizations or other entities associated with the group-based communication system. In some embodiments, such data can be mapped to, or otherwise associated with, other types of data (e.g., user data, permission data, or channel data).

The subject matter of the invention is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be understood by one skilled in the art and are intended to be captured within the scope of the claimed invention. Terms should not be interpreted as implying any particular ordering of various steps described unless the order of individual steps is explicitly described.

The following detailed description of embodiments of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of embodiments of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments but is not necessarily included. Thus, the technology can include a variety of combinations and/or integrations of the embodiments described herein.

FIG. 1 illustrates an exemplary hardware platform for certain embodiments of the invention. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple busses, or components may communicate with each other directly. Connected to system bus 104 is central processing unit (CPU) 106. Also attached to system bus 104 are one or more random-access memory (RAM) modules 108. Also attached to system bus 104 is graphics card 110. In some embodiments, graphics card 110 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also on graphics card 110 is GPU memory 114. Connected (directly or indirectly) to graphics card 110 is display 116 for user interaction. In some embodiments, no display is present, while in others it is integrated into computer 102. Similarly, peripherals such as keyboard 118 and mouse 120 are connected to system bus 104. Like display 116, these peripherals may be integrated into computer 102 or absent. In some embodiments, additional peripherals such as a microphone or video camera may also be present and connected to system bus 104. In some embodiments, such peripherals may be detachable connected to computer 102 via a wired or wireless connection. In other embodiments, such as a tablet or smartphone, these peripherals are integrated into computer 102. Also connected to system bus 104 is local storage 122, which may be any form of computer-readable media and may be internally installed in computer 102 or externally and removably attached.

Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 124 is also attached to system bus 104 and allows computer 102 to communicate over a network such as network 126. NIC 124 can be any form of network interface known in the art, such as Ethernet, ATM, fiber, Bluetooth, or Wi-Fi (i.e., the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write, and seek operations, or any level of complexity in between. Some data stores may additionally provide management functions for data sets stored therein such as backup or versioning. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In some embodiments, computer 102 can itself be directly connected to Internet 132.

Figure 2:
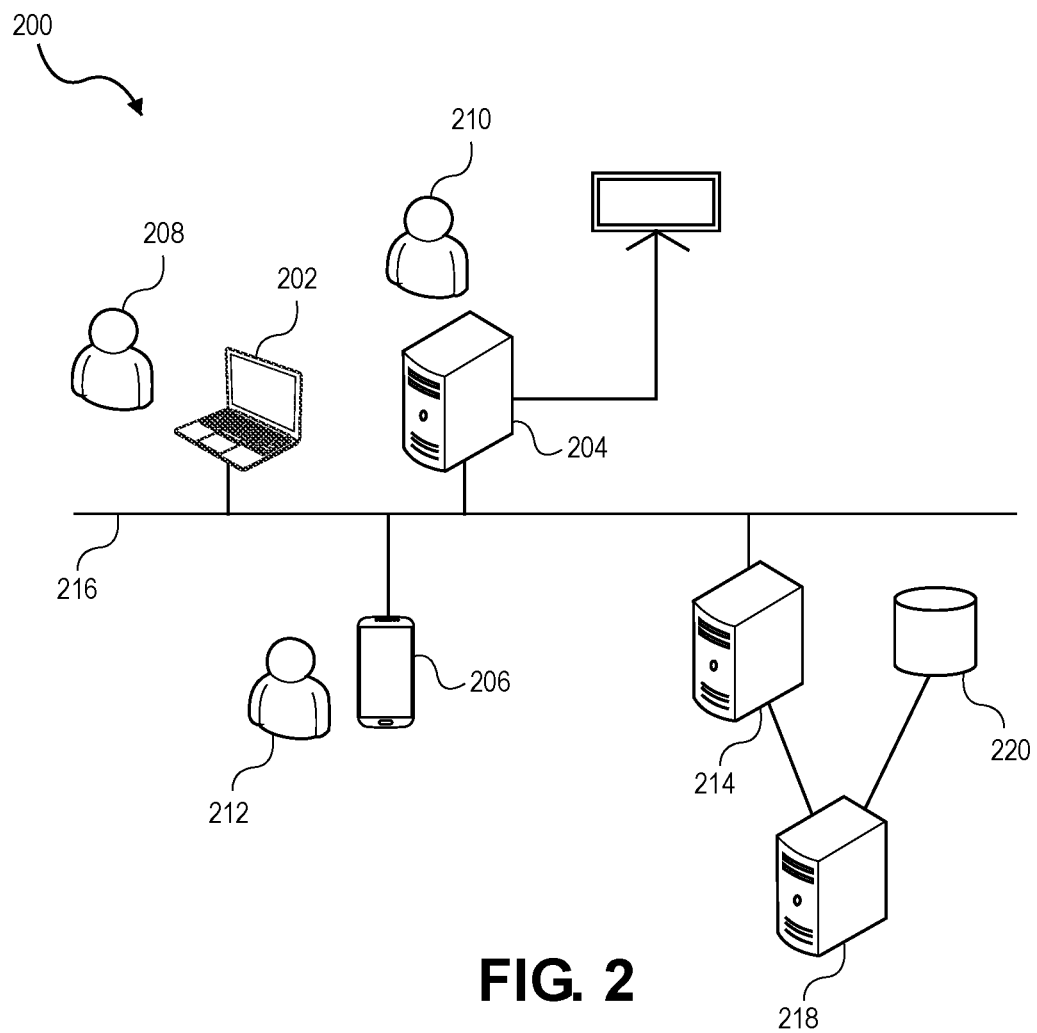
FIG. 2 depicts components of a system for carrying out embodiments of the invention.

FIG. 2 illustrates elements of a system 200 for carrying out embodiments of the invention. System 200 includes any number of client devices such as client device 202, client device 204, and client device 206 associated with user 208, user 210, and user 212 respectively. Although system 200 is depicted with one client device per user, an individual user may connect to the group-based communication system using multiple client devices, either concurrently or sequentially. Similarly, in some embodiments, multiple users may share (concurrently or sequentially) a single client device to access the group-based communication system. As depicted in FIG. 2, client devices may be any form of computing device discussed above with respect to FIG. 1. In particular, a user may access the group-based communication system using a desktop, a laptop, or a mobile device. The group-based communication system may be accessible via dedicated software of the client device or via the web browser of the client device. In some embodiments, channel administrators can access administrative functionality via any client device. In other embodiments, administrative functions can only be accessed from a limited subset of client devices (for example, only via client device 202). In some embodiments, the group-based communication system is a channel-based messaging platform.

The group-based communication system is hosted by group-based communication system server 214. Group-based communication system server 214 may be a dedicated server, a shared server, a virtual machine instance in a cloud computing environment, or any other form of computing device discussed above with respect to FIG. 1. Although a single group-based communication system server 214 is depicted, embodiments with multiple such group-based communication system servers are also contemplated so as to provide scale, redundancy and/or isolation between different instances of the group-based communication system. For example, a software development company may not wish to have its group-based communications system hosted on the same server as a competitor's group-based communication system for security reasons. Server 214 is communicatively coupled to client devices 202, 204, and 206 via network 216. Network 216 may be a local area network (LAN), wide-area network (WAN), virtual private network (VPN) or the Internet. Broadly speaking, any type of network for providing communication between the various components of system 200 is contemplated. Group-based communication system server 214 may provide web server functionality to enable web-based clients and non-web server functionality to enable clients using a dedicated app. Alternatively, both web-based clients and dedicated-app clients might both use a single web server, or the web server might be a gateway providing web-based access to the dedicated-app server. Other techniques for enabling communication among various types of client application are also contemplated.

Logging server 218 is communicatively connected to group-based communication system server 214. Logging server 218 may be a dedicated server, a shared server, a virtual machine instance in a cloud computing environment, or any other form of computing device discussed above with respect to FIG. 1. In some embodiments, logging server 218 is part of the group-based communication system server 214. Logging server 218 may implement the present invention by monitoring the real-time data flow from the group-based communication system server 214. Other techniques for enabling logging of the group-based communication system server 214 are also contemplated.

Group-based communication system data store 220 is communicatively connected to logging server 218. In some embodiments, the group-based communication system server 214 communicates directly with the group-based communication system data store 220. As depicted, group-based communication system data store 220 is directly connected to logging server 218; however, any form of communicative connection (for example, network-attached storage (NAS), a network file system (NFS), or cloud-based storage) can be employed. Broadly speaking, group-based communication system data store 220 stores all of the durable information used by group-based communication system server 214 passing through logging server 218. For example, group-based communication system data store 220 may store all of the messages with their associated channels, documents and images uploaded to particular channels, channel membership information, and/or user information. In some embodiments, collaboration sessions may be archived and stored on the group-based communication system data store 220 for subsequent retrieval. As previously discussed, multiple group-based communication system servers may be present in system 200. In such embodiments, each group-based communication system server may have its own copy of group-based communication system data store 220. Alternatively, multiple group-based communication system servers may share a single network-attached group-based communication system data store. Alternatively, or in addition, in any of these embodiments, data may be sharded across multiple group-based communication system data stores 220.

Figure 3:
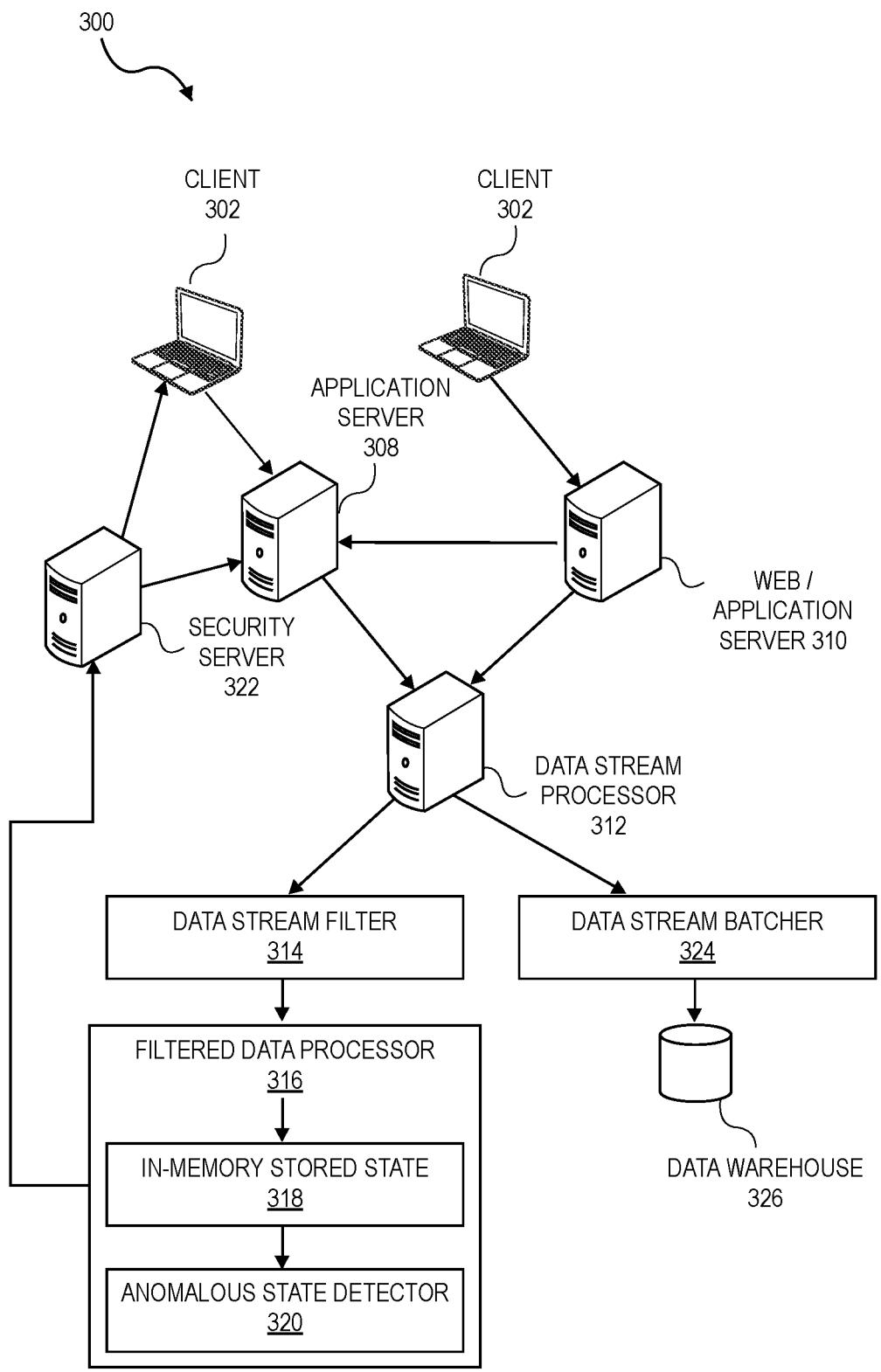
FIG. 3 depicts an exemplary system for certain embodiments of the invention.

FIG. 3 illustrates elements of a system 300 for carrying out embodiments of the invention. System 300 depicts an exemplary system in which real-time data streams can be monitored both in real time and at a later date. System 300 includes one or more clients 302. Although only two such clients 302 are shown, it is contemplated that system 300 may incorporate millions of concurrent users. Client 302 may be a laptop, desktop, or mobile device running an application. For example, one example of an application which can be used with embodiments of the invention is a group-based communication system. In some embodiments, client 302 may run a web browser that in turn runs a web application by communicating with web/application server 310. In other embodiments, client 302 may run a native application that communicates directly with application server 308. In still other embodiments, client 302 may be a smartphone or other mobile device running a mobile app that communicates with one of web/application server 310 and application server 308. Although only a single web/application server 310 and a single application server 308 are depicted, it is contemplated that many instances of web/application server 310 and application server 308 may be provided for redundancy and scale. In some embodiments the same application may communicate through both application server 308 and a web/application server 310 (which may, in some such embodiments, be simply web server 310). For example, a client 308 running the application in a web browser may communicate with web server 310 to receive a front-end application, which in turn communicates with the application server 308 to perform back-end functionality. In some embodiments the data flowing between the client 302 and (directly or indirectly) application server 308 may be a series of API calls to an API provided by web application 308, and this may be the case regardless of whether client 302 runs a native application, a web application, or a mobile app. A user of a client 302 may use multiple clients 302 at sequentially or concurrently. In some embodiments, application server 308 may log each received API call, either locally or via a remote logging service. In some such embodiments, each API call may generate a single, discrete log entry (such as, for example a single database entry or a single line in a log file).

Broadly, data stream processor 312 may receive all of the log data from the application server(s) 308 and/or the web/application servers 310(*s*). Broadly speaking, data stream processor 312 may receive this log data in whatever form it is generated by application server(s) 308 and/or the web/application servers 310(*s*). API log data may include data and metadata for the respective API call. For example, API log data for a particular API call may include a user ID, user IP address, user agent, user client version, API call invoked, API parameters, server ID, server version, server IP address. Other log data fields are also usable with embodiments of the invention. In some embodiments, the data stream processor 312 may sort, merge, filter, or otherwise process the data it receives. In some embodiments, data stream processor 312 may send some or all of the data received to data stream batcher 324. In other embodiments, data stream batcher 324 may be incorporated into data stream processor 312.

The data stream batcher 324 accumulates the data in memory or in local storage for post-analysis or bulk storage. In some embodiments the data stream batcher 324 may periodically send the data to a data warehouse 326. For example, data stream batcher 324 may optionally compress and store log data hourly to data warehouse 326 for long-term storage. In some embodiments the data warehouse 326 may store all or substantially all of the information that flows through the data stream processor 312. In some embodiments the data warehouse 326 may periodically back up the data to ensure a copy is stored safely.

Concurrently with sending the data received to data stream batcher 324, data stream processor 312 may also send the data to a data stream filter 314 in real time. In some embodiments the data stream filter 314 is incorporated into the data stream processor 312. Broadly speaking, data stream filter 314 applies one or more filters to the data. In some embodiments the filters are determined by a system administrator or by an application administrator. In some embodiments the filters may be determined by a machine learning model. For example, the machine learning model for determining filters may use k-means clustering to categorize the log data entries into broad clusters, some of which may be filtered out by data stream filter 314 while others pass through. One skilled in the art will appreciate that a variety of machine learning techniques may be applied to separate out the more relevant data log entries. In some embodiments the less relevant subset of data may be filtered out and not retained in memory. In some embodiments, data stream filter 314 further parses the log data entries to extract the relevant fields. For example, if an API data log entry is a text line in a predetermined format, regular expressions or other parsing tools may be used to extract the user ID, user IP address, user token ID, and other relevant fields and populate a standardized data structure. In this way, log entries from different sources can be standardized without requiring all sources of log data to produce log data in a common format. In some embodiments, the data stream filter 314 may additionally enrich the API log data entry with external data, as discussed in additional detail below. In some embodiments, the API logs use a structured format where each field is typed and can be read directly using a standardized data structure such that no regular expressions are needed to read the data.

In some embodiments, data stream filter 314 may additionally partition the log data entries among one or more filtered data processors for reasons of scale or redundancy. This partitioning may be performed intelligently so that related data entries are sent to the same filtered data processor 316. For example, the user IDs may be hashed and sent to a filtered data processor 316 based on the hashed value such that all entries for a given user are sent to the same filtered data processor 316. In some embodiments, data stream entries may be sent to multiple filtered data processors 316 based on multiple fields. For example, data log entries may be sent to one filtered data processor 316 based on user ID (such that all log data entries associated with the same user are processed by the same filtered data processor 316) and to a second filtered data processors 316 based on the server IP address (so that all API calls handled by the same server are processed by the same filtered data processor 316). Data stream filter subsequently sends the filtered data to the appropriate one or more filtered data processors 316.

The filtered data processor 316 may include one or more instances of an in-memory stored state 318. Although the term "in-memory stored state" is used, it is also contemplated that stored state could be stored in any medium that is possible to access in real time. Responsive to receiving a data log entry, the filtered data processor 316 may analyze the data and in response to the data modify an appropriate in-memory stored state 318 based on an element within the filtered data. For example, one type of in-memory stored state may include all failed login attempts by users. Upon receiving a log data entry indicating a failed login attempt by a particular user, the instance of the in-memory stored state for that user can be updated. For example, the "failed login attempt" stored state could be a simple count of failed login attempts for the particular user. In such an embodiment, the in-memory stored state 318 may be incremented based on the filtered data. More broadly speaking, in-memory stored state can be arbitrarily complex. For example, the "failed login attempt" could instead be a list of timestamps of failed login attempts, such that sufficiently old, failed login attempts can be discarded. In these embodiments, the value of the filtered data may be added to the list of entries in the stored stamp. As still another example, the "failed login attempt" stored state could simply be a single value indicating the timestamp of the last failed login attempt. In such embodiments, the in-memory stored state 318 may be updated to a new value based on the filtered data. The data fields and types of data retained in each in-memory stored state may be specified by a system administrator or may be automatically determined using a machine learning classifier trained on previously detected (or previously flagged) anomalous API calls.

The filtered data processor 316 may include an anomalous state detector 320. The anomalous state detector 320 may be triggered when an in-memory state is updated. The anomalous state detector 320 also analyzes one or more instances of the in-memory stored state 318 to determine that the in-memory stored state 318 has become anomalous due to one or more anomalous API calls. In some embodiments the anomalous state detector 320 may determine that the in-memory stored state 318 is anomalous because the in-memory stored state 318 represents a value that exceeds a predetermined threshold. Continuing the previous example, if the in-memory state tracks the number of failed login attempts for a user within the past ten minutes, after the in-memory state is incremented to a value of three, anomalous state detector 320 may flag the login attempts as anomalous, potentially indicating that a malicious party is attempting to login as the user associated with that particular instance of the in-memory state. In some embodiments, the anomalous state detector 320 may determine that the in-memory stored state 318 is anomalous because the in-memory stored state 318 changed from a permissible to an impermissible value. For example, if a user-agent string associated with an API call determines that a first user-agent string is updated to a second user-agent string during a session, that might indicate that a malicious user is trying to hijack a session in-progress. In some embodiments the anomalous state detector 320 may determine that the in-memory stored state 318 is anomalous based on multiple instances of the in-memory stored state 318 in combination corresponding with an anomalous pattern. In some embodiments the anomalous state detector 320 may determine that the in-memory stored state 318 is anomalous based on a machine learning model.

In some embodiments the anomalous state detector 320 may determine that the data is anomalous based on information about the client 302. Client-specific in-memory stored state may be stored by (for example) user ID, client IP address, or client authentication token. For example, one per-user ID in-memory stored state might track the localization of the client associated with the session. If the in-memory stored state 318 for a particular user shows that the client localization is typically in English but is changed to a second language, the anomalous state detector 320 may determine that this change is anomalous. As another example, if a per-user ID stored state tracking the operating system used by the user shows that the operating system has changed, the anomalous state detector 320 may determine that the change is anomalous. A per-client IP address stored state might track the distinct user IDs that have logged in from that IP address. For example, if hundreds of different user IDs have logged in from the same domestic IP address, that may indicate that a bot running at that IP address is impermissibly making API calls on behalf of users. A per-token in-memory stored state might track the geolocation associated with a particular login session. For example, if the same authentication token is used for a session originating in a first country and a second country concurrently, that may indicate that a user's authentication token has been stolen.

In other embodiments, the anomalous state detector 320 may determine that the data is anomalous based on the frequency of API calls. For example, a large number of messages associated with the same in-memory stored state sent in a short amount of time may signify that the messages were sent through a computer program or some form of automation and therefore may be anomalous. In some embodiments, the anomalous state detector 320 may send the anomalous data to a security server 322, or otherwise inform the security server 322 that anomalous data has been detected. In some embodiments the security server 322 may be a part of the filtered data processor 316. The security server 322 may then take appropriate remediation actions. For example, when an abnormal session is detected, all sessions associated with that token may be ended and the user required to log in again. In some embodiments the remediation action may comprise sending a notification to a web application 308. In some embodiments the remediation action may comprise sending a notification directly to the client 302.

Figure 4:
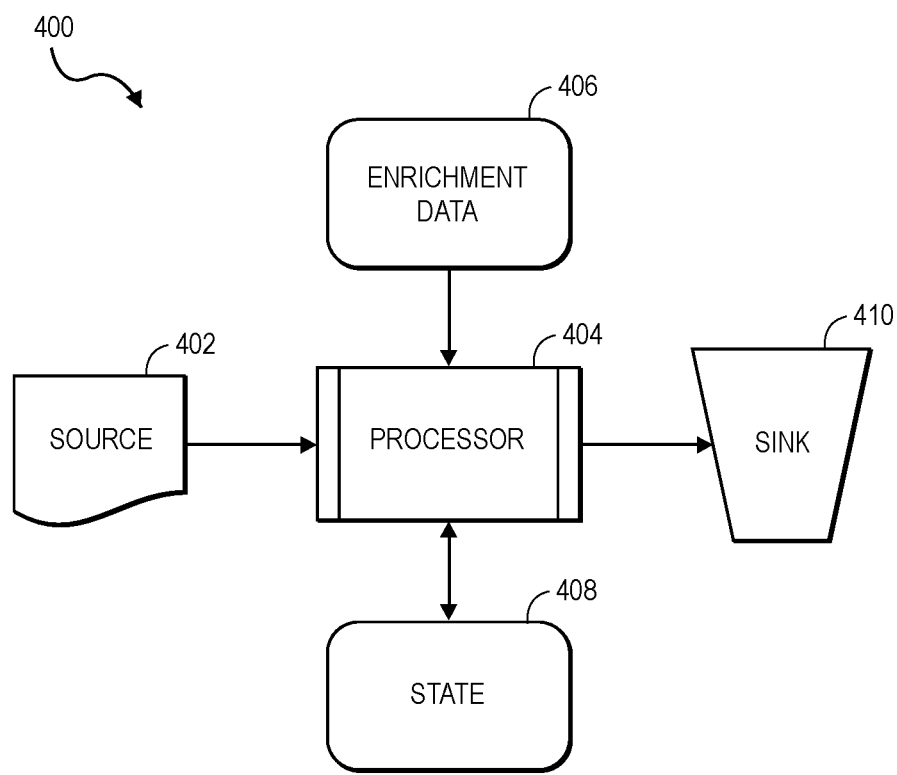
FIG. 4 depicts an exemplary system for processing data.

FIG. 4 depicts portions of an exemplary data processing system 400. The source 402 sends data to the processor 404. Broadly speaking the data correspond to one or more interrelated data fields. In some embodiments the source 402 may provide data in real time or in batches. In some embodiments the source 402 may provide data as a series of server logs, which may originate at one or more applications. In some embodiments the source 402 may provide data corresponding to the entirety of API calls from all clients to an application. Alternatively or in addition, in some embodiments the source 402 may provide data corresponding to one or more users of the application.

The processor 404 receives and analyzes the data. The processor 404 modifies a state 408 corresponding to one or more data fields of the data. Conceptually, in some embodiments, a state has a key and at least one associated value. The key associated with a state may include a user ID, a user authentication token, an IP address, or another criterion useful for grouping log data entries. In some embodiments the value of state 408 may be a version of a client, browser, or operating system. In some embodiments the value of state 408 may include one or more timestamps. For example, one example of an in-memory state may track a last known IP address associated with a user. When updating that state based on an incoming data log entry, the key would be the user ID field for the data log entry and the value would be the IP address associated with the data log entry. Similarly, for a state 408 tracking failed login attempts by the user, the key might be the user ID and the value a count of failed attempts or a list of timestamps associated with failed attempts. In some embodiments, the state 408 may be stored in memory, while in other embodiments the state 408 may be stored in a database. In some embodiments modifying the state 408 involves incrementing a variable. In other embodiments modifying the state 408 involves changing a past value to a new value corresponding to the data. In still other embodiments modifying the state 408 involves setting the state 408 to a new value based in part on the previous value of the state 408 and the data. The types of keys and values stored as state 408 may be specified by a system administrator or (as previously discussed) automatically determined via machine learning. Furthermore, in some embodiments there may be multiple instances of a state 408 for any given data flow. For example, a state 408 such as the time a user last logged in to a system may be stored on a per-device, per-client, or a per-workspace basis.

In some embodiments, the processor 404 may also receive enrichment data 406. In some embodiments the processor 404 may modify a state 408 based in part on the enrichment data 406. In some embodiments the processor 404 may request specific enrichment data 406 based on the data received from the source 402. In some embodiments, enrichment data is any data from a source external to the log data entry. For example, the enrichment data 406 may comprise geolocation data for a user login based on a mapping between IP addresses and physical location. This may permit the invention to detect anomalous API calls based on the geolocation of origin of the API call. Similarly, the IP address may be cross-referenced against a list of IP addresses or autonomous system numbers (ASNs) known to be malicious or associated with known botnets, or user agents known to be used by bots.

In some embodiments the processor 404 may send some or all of the data received from the source 402 and/or the enrichment data 406 to a sink 410. The sink 410 may be a server, a database, or any other data storage system, or may be an additional pipeline stage for further processing of the forwarded data. In some embodiments the sink 410 may retain the data in memory for a set amount of time. In some embodiments the sink 410 may initiate a remediation action based on the data received. In such embodiments the sink 410 may retain the data in memory until the remediation action is initiated, at which point the data may be removed from the sink 410. In some embodiments the data in the sink 410 may be analyzed by external systems and further processed. For example, the sink 410 may retain a list of anomalous API calls that correspond to a malicious IP address for reporting purposes. In other embodiments, sink 410 may also perform anomaly detection based on aggregated or passed-through data.

Figure 5:
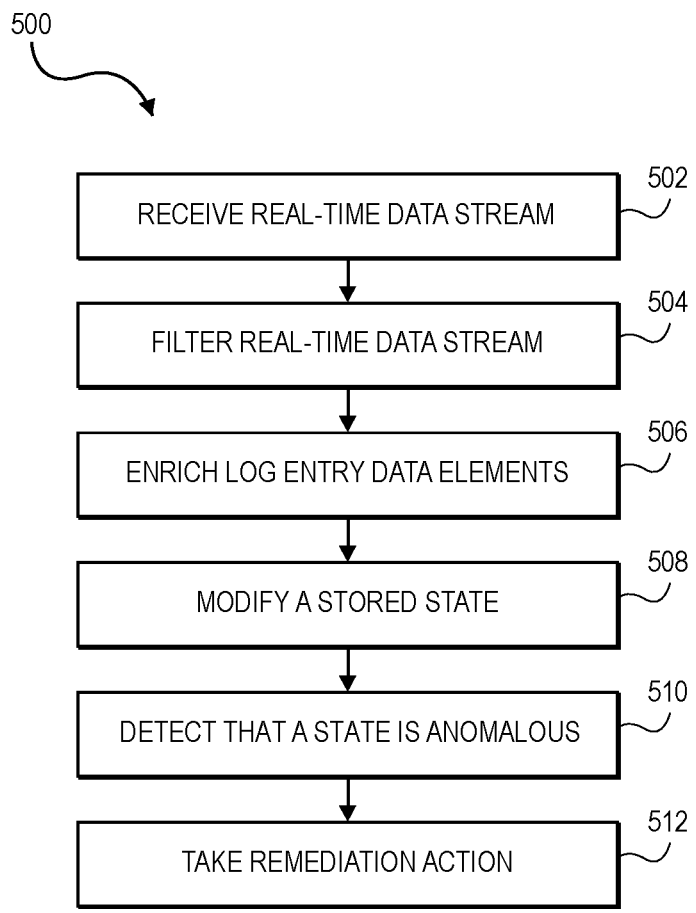
FIG. 5 depicts an exemplary flowchart for illustrating the operation of a method in accordance with one embodiment of the invention.

FIG. 5 depicts an exemplary flow chart illustrating the operation of a method 500 of detecting anomalous data within a real-time data stream. In some embodiments, method 500 enables a method of detecting anomalous data within a real-time data stream in connection with a group-based communication system. At step 502 a real-time data stream is received. The real-time data stream can come from any real-time data source. In some embodiments the real-time data source may be a group-based communication system. In some embodiments the real-time data stream may include server logs from a web-based application. In some embodiments the real-time data stream may contain log entries. In some embodiments the log entries may include data elements. In some embodiments the data elements may be associated with application programming interface (API) calls. In some embodiments the API calls may originate from software running on a mobile, laptop, or desktop device.

Next, at step 504 the real-time data stream is filtered. In some embodiments, the filters are set by one or more users or administrators of the group-based communication system. In some embodiments, the filters are determined by a machine learning model. In some embodiments, the aspects of the real-time data stream that are filtered out are sent to a database. In some embodiments the filtering further involves grouping the data within the filtered real-time data stream.

At step 506 enriching data is received from an enriching data source and used to enrich log entry data elements. In some embodiments enriching the log entry data elements may include overwriting data. In some embodiments enriching the log entry data elements may include supplementing the existing data. In some embodiments the enriching data source is an external data feed. The enriching data source may be either internal or external, and any suitable source of additional data is contemplated. For example, the enriching data may be a location corresponding to the IP address in a log entry data element. Thus, the IP address associated with the origin of the API call may be supplemented with a location from the enriching data which corresponds to the IP address, thereby allowing the system to identify a geolocation of the user. The location of a user can be important for securing a system. For example, if a user rapidly changes locations, it may be a sign of anomalous activity. As another example, some countries have a known higher risk of fraudulent activity. A user attempting to log in from such a country may be an anomalous login attempt deserving of additional scrutiny.

As another example, enriching the log entry data elements may include pulling in additional data from an external data feed. For example, the log entry data element may include an IP address. The enriching data may be a list of potentially malicious IP addresses associated with known botnets. This would allow the current IP address to be cross-referenced with the list of potentially malicious IP addresses to determine if the current API call may be from a malicious source. Similarly, internal data sources (such as lists of IP addresses previously associated with anomalous API calls) can be cross-referenced.

Next, at step 508 one or more stored states are modified. In some embodiments, the stored states are modified based in part on the filtered real-time data stream or based on a log entry within the filtered real-time data stream. In some embodiments, the modification of the stored state may be based in part on the enriched log entry data elements. In some embodiments, the one or more stored states correspond to one or more log entry data elements. In some embodiments modifying the stored state involves incrementing, replacing, updating, or supplementing the value of the stored state. In other embodiments, modifying a stored state is based in part on the current value of the stored state or on the current value of a second stored state. For example, a stored state may track the number of consecutive failed login attempts for a given user ID. A failed login attempt for that user ID would cause the value to be incremented, while a successful login attempt would cause the value to be reset to zero.

Next, at step 510 a state is detected to be anomalous. In some embodiments the state may be associated with a data element within an API call, and the corresponding API call may also be determined to be anomalous. In some embodiments a state may be detected to be anomalous based in part on the value of one or more other stored states. For example, an API call may be an unsuccessful attempt to log in to a group-based communication system and (as described above) the stored state may monitor the number of successive failed login attempts. After the number of unsuccessful login attempts passes a threshold, it may be determined that the number of unsuccessful login attempts is anomalous, and that therefore the corresponding API call is anomalous.

In another embodiment, an API call is determined to be anomalous because the location of origin of the API call is different from the location of origin of a related API call. For example, if a particular user logged in to a group-based communication system from one location and then shortly thereafter attempted to log in to the group-based communication system from a widely different geographic location, the second login attempt may be determined to be anomalous.

Finally, at step 512 a remediation action may be taken. In some embodiments, the remediation action may be to send a message to a user in a group-based communication system, such as a user associated with the user ID in the API call or a member of the security team. In some embodiments the remediation action may be to alert an administrator of a group-based communication system. In some embodiments the remediation action may be to lock an account of a user of a group-based communication system. In some embodiments the remediation action may be to send a text message, email, or push notification. In some embodiments the remediation action may involve blocking further connections from an associated IP address at the IP level. In some embodiments the remediation action may be to initiate a phone call. In some embodiments the remediation action may include storing the anomalous API call in memory for the purposes of later analysis or the training of a machine learning system.

In some embodiments the remediation action may be based on a workspace associated with the API call directly, or a workspace associated with a user associated with the API call. In some embodiments the remediation action may also be based on a particular organization, channel, message, post, thread, or any other information within the API call or a group-based communication system. In some embodiments the remediation action may additionally or instead depend on the stored state. For example, the system may determine that because the user is currently logged in to the system, the user's session may be ended such that the user is forced to log in again. In some embodiments the remediation action may be configured by an administrator of a workspace. In some embodiments the remediation action may be configured by an administrator of the group-based communication system.

Many different arrangements of the various components depicted, as well as components not shown, are possible without departing from the scope of the claims below. Embodiments of the invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims. Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. One or more non-transitory computer-readable media storing computer-executable instructions that, when executed by a processor, perform a method for detecting anomalous data within a real-time data stream, the method comprising:

receiving the real-time data stream from a real-time data source, the real-time data stream comprising a plurality of log entries, individual log entries of the plurality of log entries including a plurality of data elements, wherein at least one data element of the plurality of data elements is obtained from an application programming interface (API) call, the real-time data source being a group-based communication system and the real-time data stream including group-based communication data associated with the group-based communication system, the group-based communication data including activity within communication channels by users that are authorized to access the communication channels;

filtering, as the real-time data stream is being received, the real-time data stream based at least in part on one or more filter criteria to obtain a filtered real-time data stream comprising a subset of the plurality of log entries;

generating a modified stored state by modifying a stored state corresponding to one or more log entry data elements of a particular type based at least in part on a determination that a log entry of the subset of the plurality of log entries is of the particular type, wherein the modified stored state corresponds to one or more failed log-in attempts by a particular user of the users of the group-based communication system and the particular type corresponds to a count of the one or more failed log-in attempts;

determining whether the count meets or exceeds a predetermined threshold;

determining that the modified stored state is an anomalous state based at least in part on the count meeting or exceeding the predetermined threshold; and in response to determining that the modified stored state is the anomalous state, taking one or more remediation actions.

2. The one or more non-transitory computer-readable media of claim 1, wherein the method further comprises:

receiving enriching data from an enriching data source, wherein the enriching data source is an external data feed;

prior to modifying the stored state and based at least in part on one or more enriching rules, modifying the one or more log entry data elements using the enriching data to obtain one or more enriched log entry data elements; and updating the stored state based at least in part on the one or more enriched log entry data elements.

3. The one or more non-transitory computer-readable media of claim 1, wherein the one or more remediation actions comprise sending information regarding the anomalous state to an external system.

4. The one or more non-transitory computer-readable media of claim 1, wherein the one or more remediation actions comprise sending a message via the group-based communication system.

5. The one or more non-transitory computer-readable media of claim 1, wherein the anomalous state signifies a first potential security threat, and wherein the API call associated with each of the plurality of data elements are also determined to be the first potential security threat or a second potential security threat.

6. The one or more non-transitory computer-readable media of claim 1, wherein the stored state is associated with a particular user.

7. The one or more non-transitory computer-readable media of claim 1, wherein the filtering of the real-time data stream comprises:

clustering, using a machine learning model, the plurality of log entries into a plurality of clusters that each include different groups of log entries of the plurality of log entries; and generating the filtered real-time data stream by:

filtering out at least a first set of clusters of the plurality of clusters that are determined to have a first relevance, wherein the first set of clusters are not retained in memory; and retaining, in the memory, a second set of clusters of the plurality of clusters that are determined to have a second relevance that is greater than the first relevance.

8. The one or more non-transitory computer-readable media of claim 1, wherein the method further comprises:

partitioning the plurality of log entries into a first set of log entries that are associated with a first set of user identifiers (IDs) of a first set of users, and into a second set of log entries that are associated with a second set of user IDs of a second set of users, the first set of users being of a first type and the second set of users being of a second type;

assigning the first set of log entries to a first processor that is to process the first set of log entries; and assigning the second set of log entries to a second processor, different than the first processor, that is to process the second set of log entries, the first processor to process first subsequent log entries associated with the first type and the second processor to process second subsequent log entries associated with the second type.

9. The one or more non-transitory computer-readable media of claim 1, wherein the method further comprises generating the modified stored state by modifying the stored state corresponding to the one or more log entry data elements of the particular type based at least in part on enriching data that includes geolocation data associated with the log entry, the geolocation data being based at least in part on a mapping between an IP address associated with the log entry and a physical location associated with the log entry.

10. A method for monitoring anomalous data within a real-time data stream, the method comprising:

receiving the real-time data stream from a real-time data source, the real-time data stream comprising a plurality of log entries, individual log entries of the plurality of log entries including a plurality of data elements, wherein each at least one data element of the plurality of data elements is obtained from an application programming interface (API) call, the real-time data source being a group-based communication system and the real-time data stream including group-based communication data associated with the group-based communication system, the group-based communication data including activity within communication channels by users that are authorized to access the communication channels;

filtering, as the real-time data stream is being received, the real-time data stream based at least in part on one or more filter criteria to obtain a filtered real-time data stream comprising a subset of the plurality of log entries;

generating a modified stored state by modifying a stored state corresponding to one or more log entry data elements of a particular type based at least in part on a determination that a log entry of the subset of the plurality of log entries is of the particular type, wherein the modified stored state corresponds to one or more failed log-in attempts by a particular user of the users of the group-based communication system and the particular type corresponds to a count of the one or more failed log-in attempts;

determining whether the count meets or exceeds a predetermined threshold;

determining that the modified stored state is an anomalous state based at least in part on the count meeting or exceeding the predetermined threshold; and in response to determining that the modified stored state is the anomalous state, taking one or more remediation actions.

11. The method of claim 10, wherein the method further comprises:

receiving enriching data from an enriching data source, wherein the enriching data source is an external data feed;

prior to modifying the stored state and based at least in part on one or more enriching rules, modifying the one or more log entry data elements using the enriching data to obtain one or more enriched log entry data elements; and updating the stored state based at least in part on the one or more enriched log entry data elements.

12. The method of claim 10, wherein the one or more remediation actions comprise sending information regarding the anomalous state to an external system.

13. The method of claim 10, wherein the one or more remediation actions comprise sending a message via the group-based communication system.

14. The method of claim 10, wherein the anomalous state signifies a first potential security threat, and wherein the API call associated with each of the plurality of data elements are also determined to be the first potential security threat or a second potential security threat.

15. The method of claim 10, wherein the stored state is associated with a particular user.

16. A system comprising at least one processor and at least one non-transitory memory storing computer-executable instructions that when executed by the at least one processor cause the system to carry out actions comprising:

receiving a real-time data stream from a real-time data source, the real-time data stream comprising a plurality of log entries, individual log entries of the plurality of log entries including a plurality of data elements, wherein each at least one data element of the plurality of data elements is obtained from an application programming interface (API) call, the real-time data source being a group-based communication system and the real-time data stream including group-based communication data associated with the group-based communication system, the group-based communication data including activity within communication channels by users that are authorized to access the communication channels;

filtering, as the real-time data stream is being received, the real-time data stream based at least in part on one or more filter criteria to obtain a filtered real-time data stream comprising a subset of the plurality of log entries;

generating a modified stored state by modifying a stored state corresponding to one or more log entry data elements of a particular type based at least in part on a determination that a log entry of the subset of the plurality of log entries is of the particular type, wherein the modified stored state corresponds to one or more failed log-in attempts by a particular user of the users of the group-based communication system and the particular type corresponds to a count of the one or more failed log-in attempts;

determining whether the count meets or exceeds a predetermined threshold;

determining that the modified stored state is an anomalous state based at least in part on the count meeting or exceeding the predetermined threshold; and in response to determining that the modified stored state is the anomalous state, taking one or more remediation actions.

17. The system of claim 16, wherein the actions further comprise:

receiving enriching data from an enriching data source, wherein the enriching data source is an external data feed;

prior to modifying the stored state and based at least in part on one or more enriching rules, modifying the one or more log entry data elements using the enriching data to obtain one or more enriched log entry data elements; and updating the stored state based at least in part on the one or more enriched log entry data elements.

18. The system of claim 16, wherein the one or more remediation actions comprise sending information regarding the anomalous state to an external system.

19. The system of claim 16, wherein the one or more remediation actions comprise sending a message via the group-based communication system.

20. The system of claim 16, wherein the anomalous state signifies a first potential security threat, and wherein the API call associated with each of the plurality of data elements are also determined to be the first potential security threat or a second potential security threat.

* * * * *